(12) United States Patent
Tseng et al.

(10) Patent No.: US 9,453,955 B2
(45) Date of Patent: Sep. 27, 2016

(54) PROJECTION SYSTEM

(71) Applicant: DELTA ELECTRONICS, INC., Taoyuan Hsien (TW)

(72) Inventors: Yun-Kai Tseng, Taoyuan Hsien (TW); Sheng-Shan Teng, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 307 days.

(21) Appl. No.: 13/866,816

(22) Filed: Apr. 19, 2013

(65) Prior Publication Data

US 2014/0198362 A1 Jul. 17, 2014

(30) Foreign Application Priority Data

Jan. 15, 2013 (TW) .............................. 102101421 A

(51) Int. Cl.
*G02B 5/32* (2006.01)
*G03B 21/60* (2014.01)
*G03B 21/28* (2006.01)
*G03B 21/62* (2014.01)

(52) U.S. Cl.
CPC ................. *G02B 5/32* (2013.01); *G03B 21/28* (2013.01); *G03B 21/62* (2013.01)

(58) Field of Classification Search
CPC .... G02B 5/0252; G03H 1/0005; G03H 1/22; G03H 1/26; G03H 1/04; G03H 2001/0212; G03H 2001/2231; G03H 2001/226; G03H 2227/03; G03H 2001/264; G03H 2223/24; G03H 2250/42; G03H 21/2033; G03H 33/06; G03H 21/56; G03H 21/147; G03H 21/28; G03H 41/00; H04N 9/3147; H04N 9/3164

USPC ............ 359/15, 16, 19, 22, 24, 27, 32, 454, 359/453, 458, 459

See application file for complete search history.

(56) References Cited

U.S. PATENT DOCUMENTS 6,525,750 B1 * 2/2003 Knox .............................. 345/30
2008/0143976 A1 * 6/2008 Yokoyama et al. ............ 353/69

FOREIGN PATENT DOCUMENTS

| CN | 1957297 | 5/2007 | | |
|---|---|---|---|---|
| CN | 201075161 | 6/2008 | | |
| CN | 101642627 | 2/2010 | | |
| CN | 202153291 | 2/2012 | | |
| CN | 102480616 | 5/2012 | | |
| CN | 202637999 | 1/2013 | | |
| EP | 0799436 | 1/1999 | | |
| GB | CN 1957297 A | * | 5/2007 | .............. A63J 25/00 |
| TW | 201102676 | 1/2011 | | |
| WO | 9711405 | 3/1997 | | |

* cited by examiner

*Primary Examiner* — Jade R Chwasz
(74) *Attorney, Agent, or Firm* — Hauptman Ham, LLP

(57) ABSTRACT

A projection system includes at least one projector and a holographic projection film. The projector projects a first image to a projection surface. The holographic projection film mirrors the first image on the projection surface to form a second image on an imaging surface. The projection surface and a standard surface define a first angle therebetween. The first angle is Y degrees. The holographic projection film and the standard surface define a second angle therebetween. The second angle is 45+X degrees. Y and X substantially satisfy: Y=2X.

15 Claims, 13 Drawing Sheets

PROJECTION SYSTEM

RELATED APPLICATIONS

This application claims priority to Taiwan Application Serial Number 102101421, filed Jan. 15, 2013, which is herein incorporated by reference.

BACKGROUND

1. Technical Field

Embodiments of the present invention relate to an image presentation system. More particularly, embodiments of the present invention relate to a projection system.

2. Description of Related Art

Recently, the holographic projection technology has been widely used in the stage show the art or business exhibition, and so on. In the holographic projection technology, the projector is usually disposed on the ceiling projecting an image downwards, and the image is then processed by mirror-imaging with the holographic projection film to form a virtual image that looks like standing on the floor.

However, in the foregoing technology, the projector and the holographic film are difficult and complicatedly to arrange so as to let the virtual image stand on the floor or the stage, and to make the viewer feel more realistic. Further, the projector and the holographic projection film are limited to the landforms and cannot be flexibly arranged.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with one embodiment of the present invention, a projection system that can be flexibly arranged on various landforms is provided, and it includes at least one projector and a holographic projection film. The projector is used for projecting a first image to a projection surface. The holographic projection film is used for mirroring the first image on the projection surface to form a second image on an imaging surface. The projection surface and a standard surface define a first angle therebetween. The first angle is Y degrees. The holographic projection film and the standard surface define a second angle therebetween. The second angle is 45+X degrees. Y and X substantially satisfy: Y=2X.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
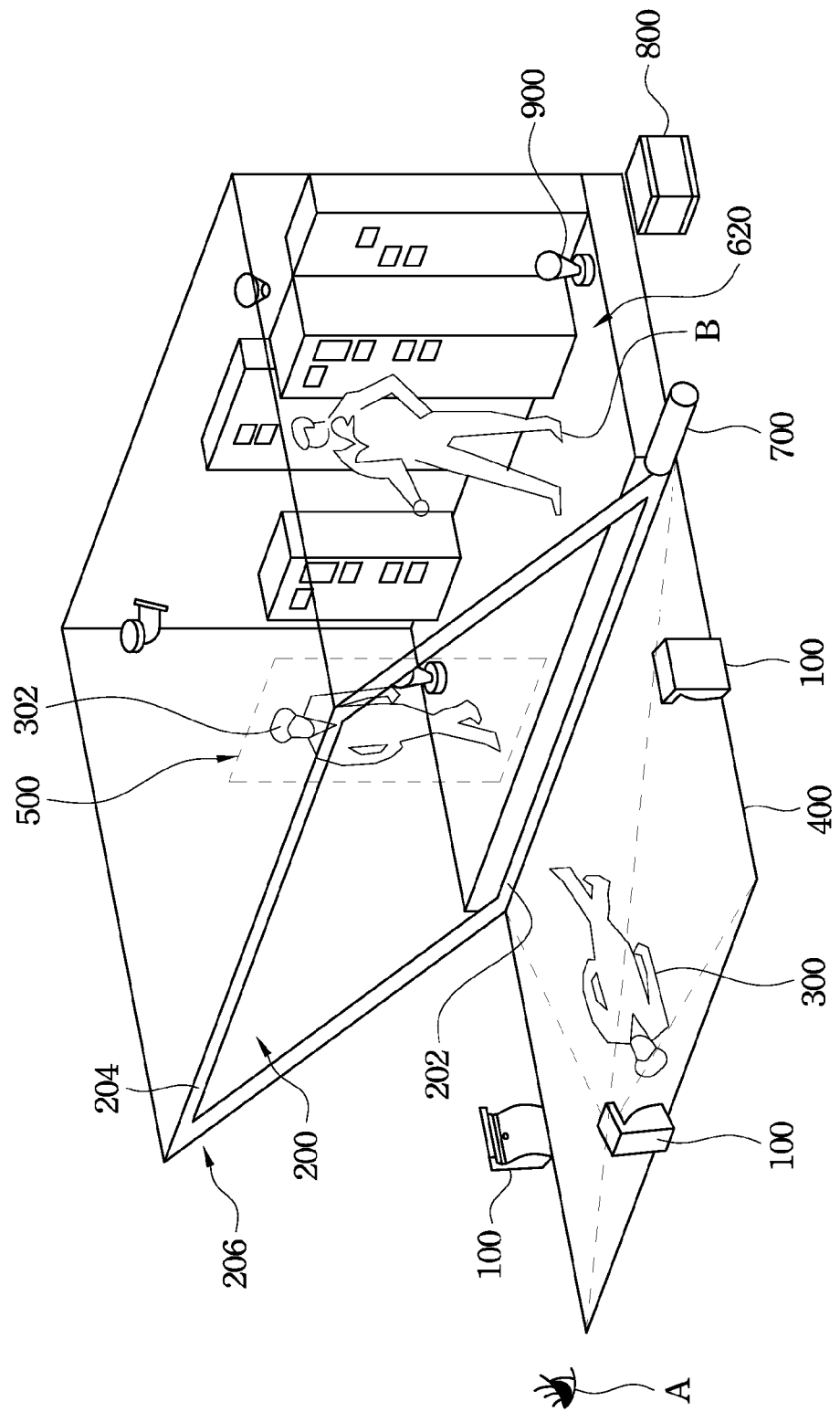
FIG. 1 is a perspective view of a projection system in accordance with the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Embodiment 1

Figure 2:
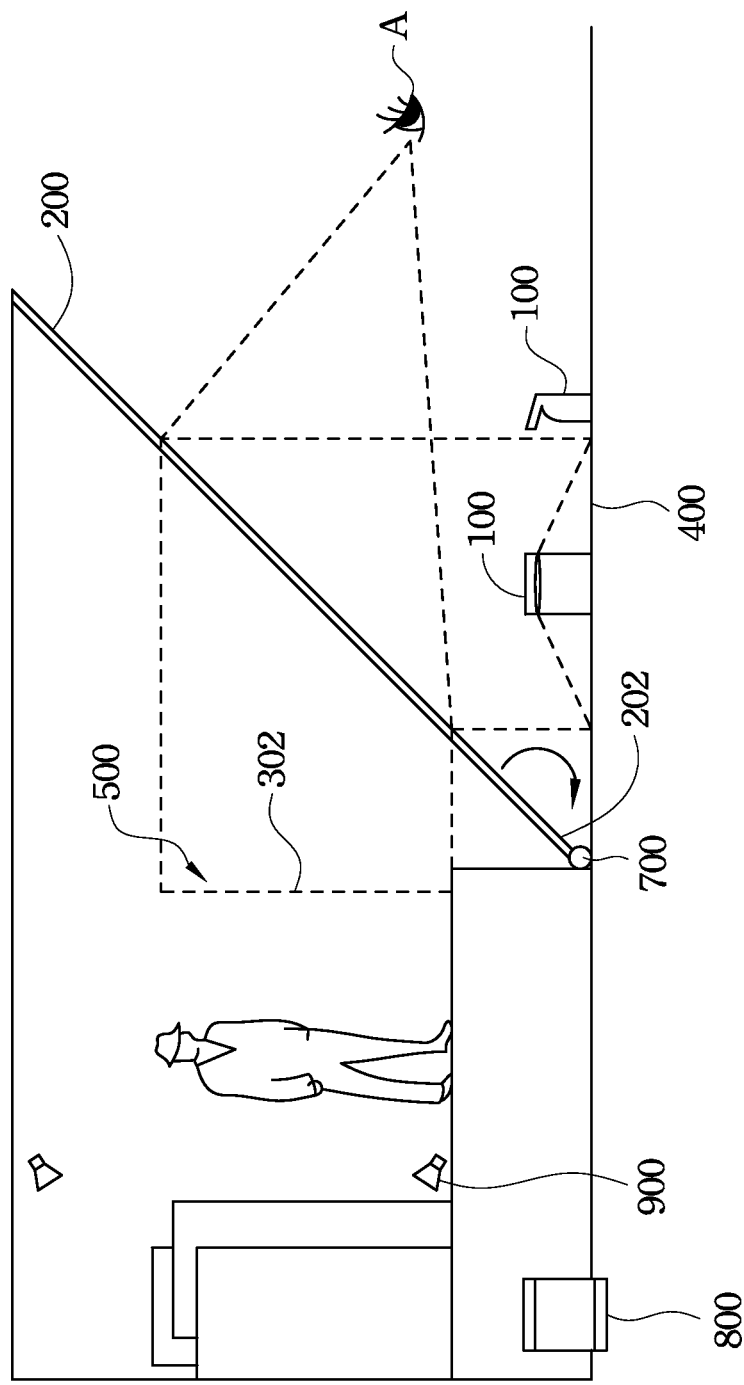
FIG. 2 is a side view of the projection system in FIG. 1.

FIG. 1 is a perspective view of a projection system in accordance with the first embodiment of the present invention. FIG. 2 is a side view of the projection system in FIG. 1. As shown in FIGS. 1 and 2, the projection system includes at least one projector 100 and a holographic projection film 200. The projector 100 is used for projecting a first image 300 to a projection surface 400. The holographic projection film 200 is used for mirroring the first image 300 on the projection surface 400 to form a second image 302 on an imaging surface 500.

It is understood that the terms "mirror", "mirroring" or "mirrored" in this specification refer that an object, such as the holographic projection film 200, can reflect the real image to a viewer's eye, so that the viewer can see the virtual image. For example, the holographic projection film 200 can reflect the first image to the eye of the viewer A, so that the viewer A can see the second image 302 behind the holographic projection film 200.

Figure 3:
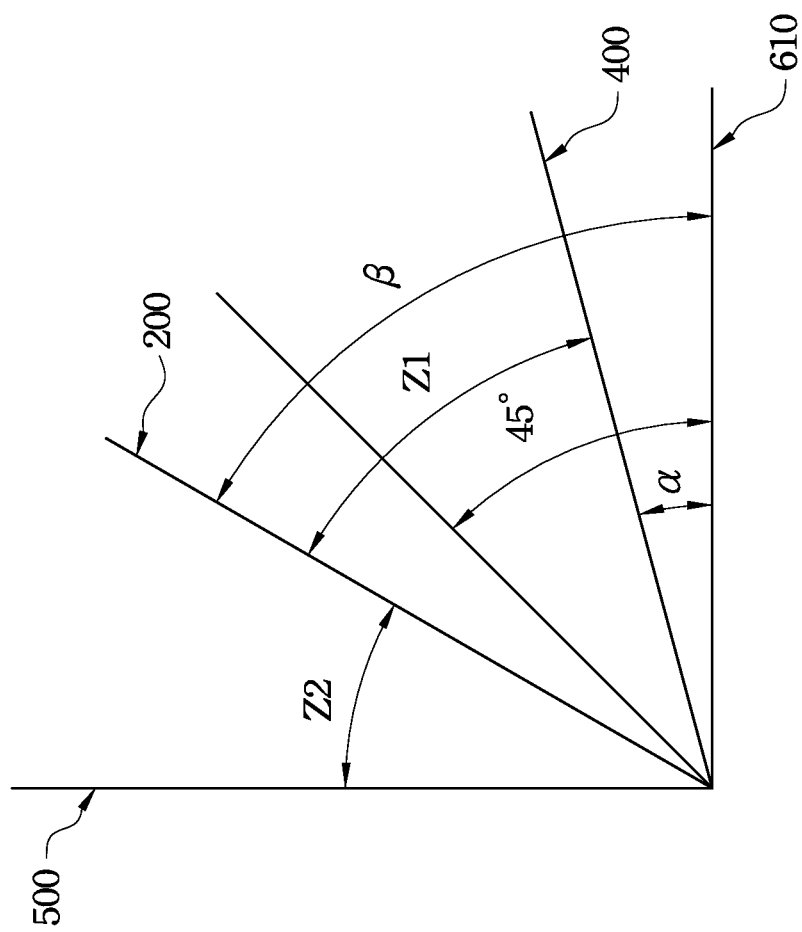
FIG. 3 is a figure illustrating the angle relations among the projection surface, the holographic projection film and a standard surface.

FIG. 3 is a figure illustrating the angle relations among the projection surface 400, the holographic projection film 200 and a standard surface 610. As shown in FIG. 3, the projection surface 400 and a standard surface 610 define a first angle α therebetween. The first angle is Y degrees. The holographic projection film 200 and the standard surface 610 define a second angle β therebetween. The second angle β is 45+X degrees. If the imaging surface 500 is required to be perpendicular to the standard surface 610, a fourth angle Z2 between the holographic projection film 200 and the imaging surface 500 is 45−X degrees, and a third angle Z1 between the projection surface 400 and the holographic projection film 200 is 45−Y+X degrees. Because the third angle Z1 between the projection surface 400 and the holographic projection film 200 is equal to the fourth angle Z2 between the holographic projection film 200 and the imaging surface 500, Y and X substantially satisfy: Y=2X. In other words, as long as the equation "Y=2X" is substantially satisfied, even though the holographic projection film 200 and the projection surface 400 are limited to the landforms and are forced to rearrange, the imaging surface 500 can still be substantially perpendicular to the standard surface 610. When the platform 620 (See FIG. 1) is parallel to the standard surface 610, the second image 302 on the imaging surface 500 can stand on the platform 620, so as to make the viewer A can see the second image 302 more easily. In some embodiments, the standard surface 610 and the platform 620 are both horizontal. In other words, the standard surface 610 and the platform 620 are both substantially perpendicular to the gravity direction. In some embodiments, the second angle β substantially satisfies: 30≤45+X≤60, degrees.

It is understood that the term "substantially" in this specification means that the tolerance is within 20, percent, preferably within 10, percent, and more preferably within 5, percent of a given value or range. For example, "Y and X substantially satisfy: Y=2X" means "2X×80%≤Y≤2X× 120%", and preferably, it means "2X×90%≤Y≤2X×110", and more preferably, it means "2X×95%≤Y≤2X×105%". In other words, "Y and X substantially satisfy: Y=2X" means that Y do not has to exactly be 2X.

It is understood that the "first image" and the "second image" in this specification includes, but is not limited to include, a static picture, a motion picture or a video.

Figure 4:
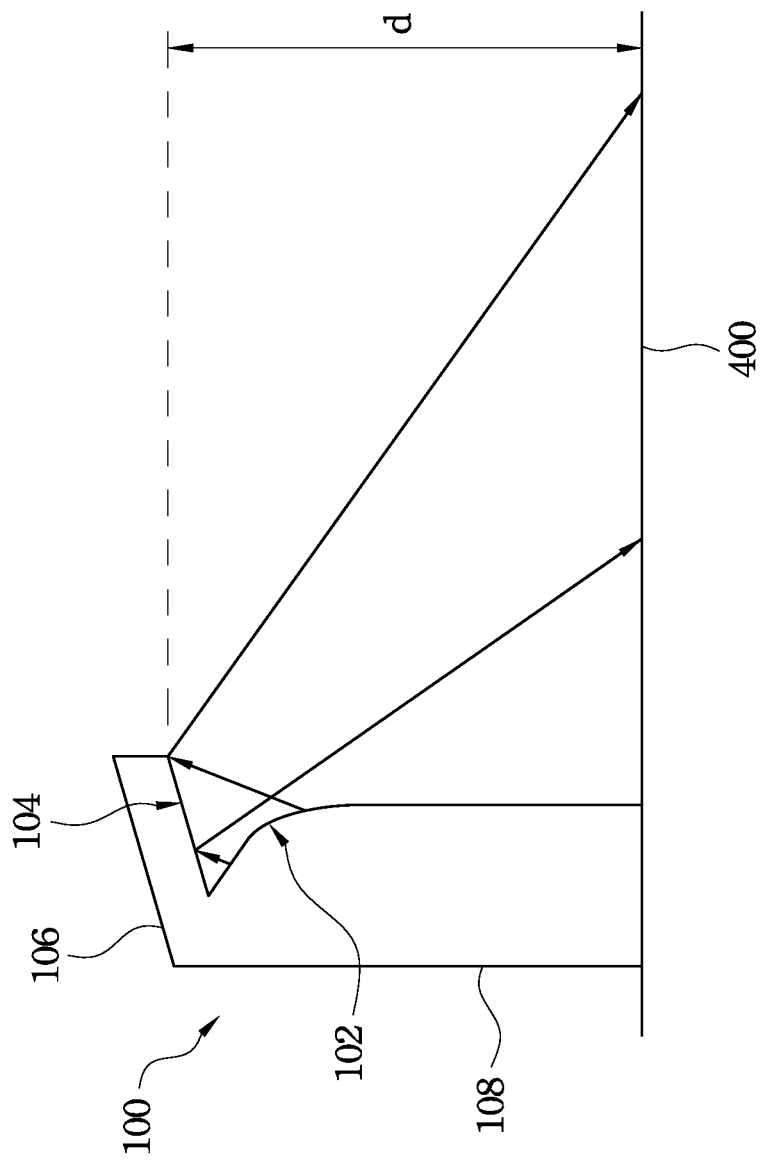
FIG. 4 is a partial side view of the projection system in FIG. 1.

FIG. 4 is a partial side view of the projection system in FIG. 1. As shown in FIG. 4, the projector 100 is disposed on the projection surface 400. In particular, the projector 100 is an ultra-short throw projector that can project the first image 300 (See FIG. 1) with large area and almost zero distortion in very short focal length. More particularly, the ultra-short throw projector includes a projector body 108, a lens module 102, a reflective mirror carrier 106 and a reflective mirror 104. The projector body 108 is disposed on the projection surface 400. In some embodiments, the projector body 108 can be in contact with the projection surface 400. In other embodiments, the projector body 108 can be put on a fixture, and this fixture can be placed on the projection surface 400. The lens module 102 is disposed in the projector body 108 for generating and enlarging an initial image (not shown), and it can project the initial image to the reflective mirror 104. The reflective mirror carrier 106 is connected to the projector body 108. The reflective mirror 104 is disposed on the reflective mirror carrier 106, and is spatially separated from the projector body 108 and the lens module 102. The reflective mirror 104 is used for adjusting the aberration and the distortion of the initial image projected by the lens module 102. The reflective mirror 104 can reflect the adjusted initial image to the projection surface 400, so as to form the first image 300. By the lens module 104 and the reflective mirror 104, the projector 100 can project the first image 300 with large area and almost zero distortion in very short focal length.

One end of the reflective mirror carrier 106 is connected to the projector body 108, and another end is spatially separated from the projector body 108, so that the reflective mirror 104 can be spatially separated from the projector body 108 and the lens module 102. The mirror surface of the reflective mirror 104 can be, but is not limited to be, spherical surface or other curved surface that is aspheric.

In this embodiment, the projection surface 400 can be the floor. In other words, the projector 100 is placed on the floor and utilizes the reflective mirror 104 to project the first image 300 (See FIG. 1) to the floor.

In this embodiment, the TR (Throw Ratio) of the projector 100 substantially satisfies: 0<TR<0.38. In this embodiment, the reflective mirror 104 and the projection surface 400 define a maximum distance d therebetween. The maximum distance d substantially satisfies: 2.24, cm≤d≤6.23, cm. Within the foregoing range of the maximum distance d, the projector 100 can projects frames with area ranges from about 87, inches to 97, inches. In other words, interval between the reflective mirror 104 and the projection surface 400 is only about 2.24, cm to 6.23, cm, and the projector 100 can project the first image 300 (See FIG. 1) with large area and almost zero distortion in very short focal length. Therefore, as long as the interval between the reflective mirror 104 and the projection surface 400 ranges about 2.24, cm to 6.23, cm, the projector body 108 can be placed on the projection surface 400 without departing from the projection surface 400, so as to reduce the space that the projection system requires, thereby assisting the user to arrange the projector 100 more flexibly.

Referring back to FIG. 1, in this embodiment, the projection system alternatively includes a holographic projection frame 206 and an angle adjusting device 700. The holographic projection frame 206 encompasses the holographic projection film 200. The angle adjusting device 700 is coupled to the holographic projection frame 200 for adjusting the second angle β between the holographic projection film 200 and the standard surface 610 (See FIG. 3). The angle adjusting device 700 is connected to the holographic projection frame 206, and can drive the holographic projection frame 206 to rotate, so as to adjust the second angle β, thereby facilitating the user to put the holographic projection film 200 on various landforms, such as the floor with various s elevation angles. In some embodiments, when the projection surface 400 is not parallel to the standard surface 610 (See FIG. 3), the first angle α is Y degrees, in which Y≠0. The angle adjusting device 700 can drive the holographic projection film 200 to rotate, so as to adjust the second angle β to be 45+X degrees, in which X≠0. Y and X substantially satisfies: Y=2X, so that the imaging surface 500 can be substantially perpendicular to the standard surface 610. In other words, even through the projection surface 400 is not parallel to the standard surface 610, the imaging surface 500 can still be substantially perpendicular to the standard surface 610 by utilizing the angle adjusting device 700 to rotate the holographic projection film 200. The angle adjusting device 700 can be, but is not limited to be, a bearing motor.

In some embodiments, the transmittance T of the holographic projection film 200 substantially satisfies: 70%≤T≤90%. 90%. For example, the transmittance T can be 89%. Therefore, the holographic projection film 200 not only mirrors the first image 300 on the projection surface 400 to form the second image 302 on the imaging surface 500, but also allows the viewer A to see other objects, such as the stage scene, behind the holographic projection film 200.

In some embodiments, the projection system alternatively includes at least one illumination device 900. The illumination device 900 is disposed on one side of the imaging surface 500 opposite to the holographic projection film 200. In other words, the imaging surface 500 is positioned between the holographic projection film 200 and the illumination device 900. When the illumination device 900 emits light, it can enhance the space impression of the second image 302. The illumination device 900 can be, but is not limited to be, a wall washer or a spotlight.

As shown in FIG. 1, in some embodiments, a real person B can stand on the platform 620, and the real person B can interact with the second image 302, so as to improve the stage effect.

Figure 5:
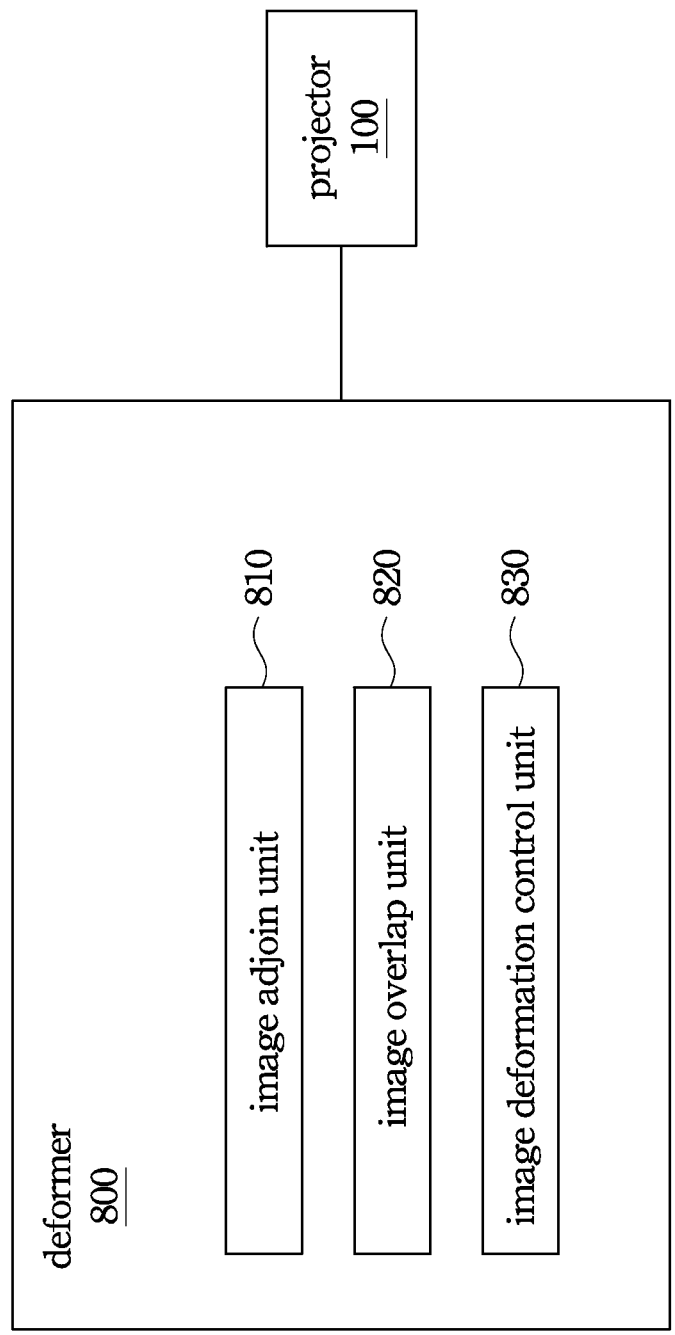
FIG. 5 is a block diagram of the projector and a deformer.

FIG. 5 is a block diagram of the projector 100 and a deformer 800. As shown in FIG. 5, the projector 100 is electrically connected to the deformer 800. The deformer 800 includes an image adjoin unit 810 for adjoining numerous first images 300 (See FIG. 1) projected by numerous projectors 100, so as to form a large-size image by the first images 300.

In some embodiments, the deformer 800 alternatively includes an image overlap unit 820 for overlapping numerous first images 300 (See FIG. 1) projected by numerous projectors 100. As shown in FIG. 1, the projectors 100 can be respectively positioned on different edges of the projection surface 400. Each projector 100 can utilize the reflective mirror 104 (See FIG. 4) thereof to project a first image 300 to the projection surface 400. These first images 300 can be overlapped with each other, so as to improve the brightness. The image overlap unit 820 controls each first image 300 can be exactly overlapped, so that the overlapped first images 300 and the second images 302 will not be obscure.

Because the reflective mirror 104 of the projector 100 (See FIG. 4) can adjust the aberration and the distortion of the initial image, when the projector 100 is horizontally placed on the projection surface (See FIG. 4), the first image 300 projected by the projector 100 will not deform. In some embodiments, the projector 100 is not horizontally placed on the projection surface 400, and the first image 100 projected by the projector 100 may deform. The deformer 800 can alternatively include an image deformation control unit 830. The projector 100 can utilize the image deformation control unit 830 for suppressing the deformation of the first image 300 on the projection surface 400 (See FIG. 1). Therefore, even though the first image 300 projected by the projector 100 deforms due to the environmental factor, such as that the projector 100 is not horizontally placed on the projection surface 400, the image deformation control unit 830 of the deformer 800 can still suppress the deformation.

The deformer 800 can be, but is not limited to be, a computer, a CPU, a microprocessor or a DSP. The image adjoin unit 810, the image overlap unit 820 and the image deformation control unit 830 can be, but is not limited to be, implemented by the software or the firmware installed in the deformer 800. In some embodiments, the deformer 800 can be embedded in the projector 100.

Embodiment 2

Figure 6:
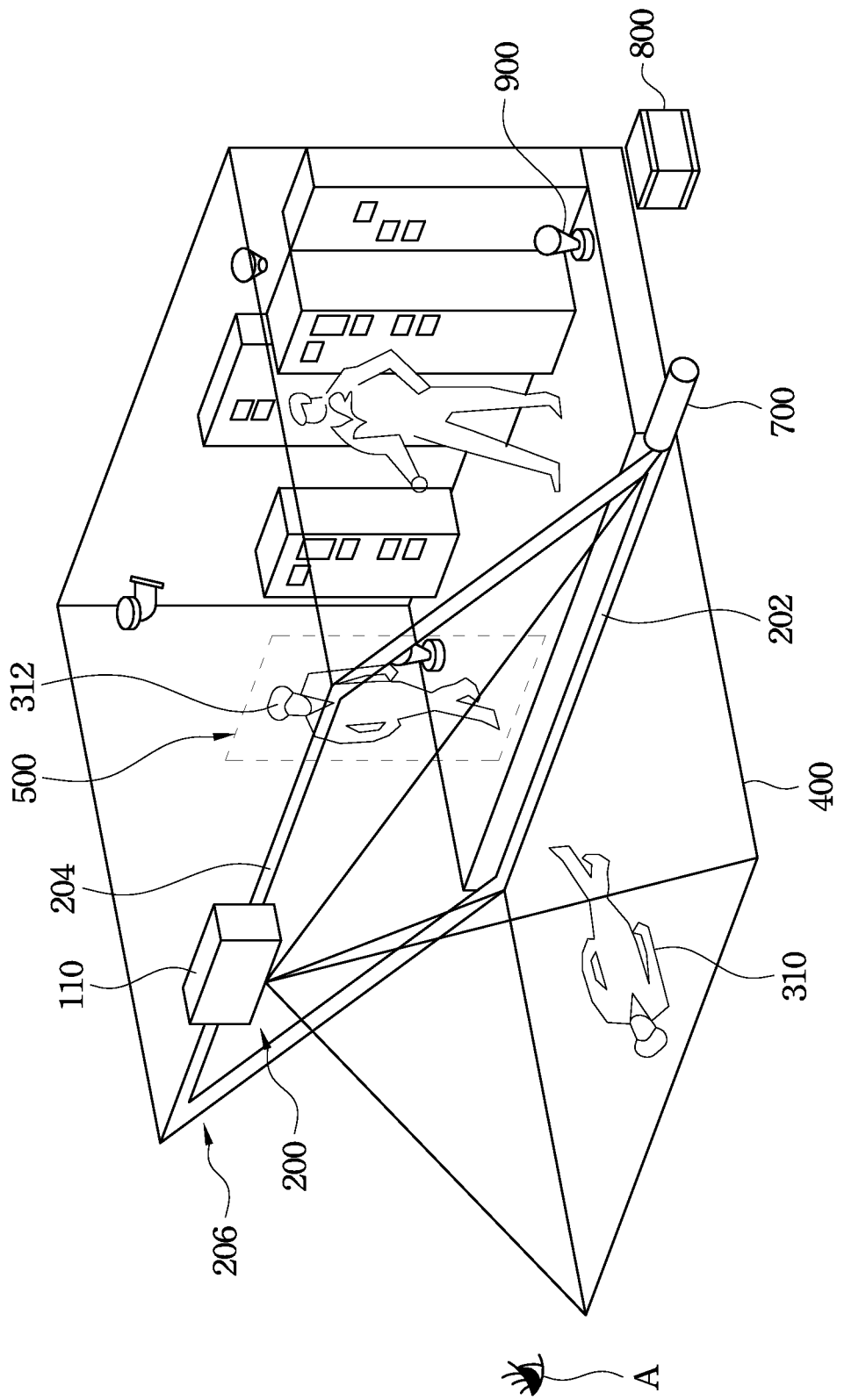
FIG. 6 is a perspective view of a projection system in accordance with the second embodiment of the present invention.
Figure 7:
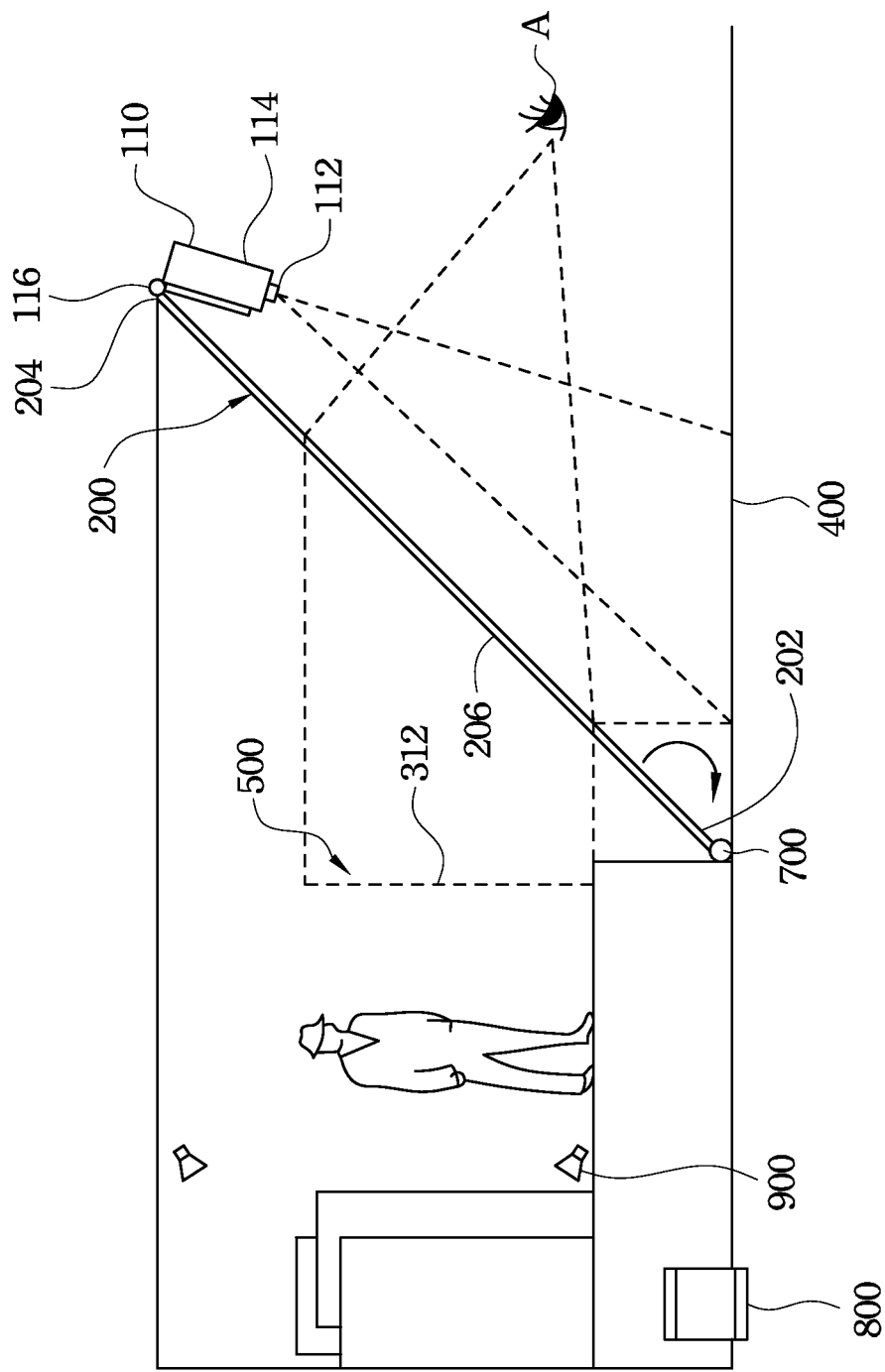
FIG. 7 is a side view of the projection system in FIG. 6.

FIG. 6 is a perspective view of a projection system in accordance with the second embodiment of the present invention. FIG. 7 is a side view of the projection system in FIG. 6. As shown in FIGS. 6 and 7, the main difference between the embodiment and the first embodiment is that the projector 110 in this embodiment is not an ultra-short throw projector, and therefore, the projector 110 is not disposed on the projection surface 400, so as to focus. In particular, the holographic projection frame 206 includes a proximal frame body 202 and a distal frame body 204 opposite to the proximal frame body 202. The proximal frame body 202 is connected to the projection surface 400, and the distal frame body 204 is distal to the projection surface 400. The projector 110 is positioned on the distal frame body 204, and is spatially separated from the projection surface 400, such that the projector 110 can project the first image 310 to the projection surface 400. Similar to the first embodiment, the holographic projection film 200 can also mirror the first image 310 to form the second image 312 on the imaging surface 500.

As shown in FIG. 7, in this embodiment, the projector 110 alternatively includes a lens module 112 and a projector body 114. The lens module 112 is positioned on one end of the projector body 114, and projects the first image 310 (See FIG. 6) to the projection surface 400. The projection system alternatively includes a rotation driver 116 connected between the projector 110 and the holographic projection film 200. The rotation driver 116 can drive the projector 110 to rotate relative to the holographic projection film 200, so as to adjust the location of the first image 310.

In some embodiments, because the projector 110 obliquely projects the first image 310 to the projection surface 400, the first image 310 may deform, and the image deformation control unit 830 (See FIG. 5) of the deformer 800 can be utilized to suppress the deformation of the first image 310. For example, the image deformation control unit 830 can modify a trapezoidal frame to a rectangular frame.

Other technical features, such as the angle adjusting device 700 and the deformer 800, are described in the first embodiment, and therefore are not described herein.

Embodiment 3

Figure 8:
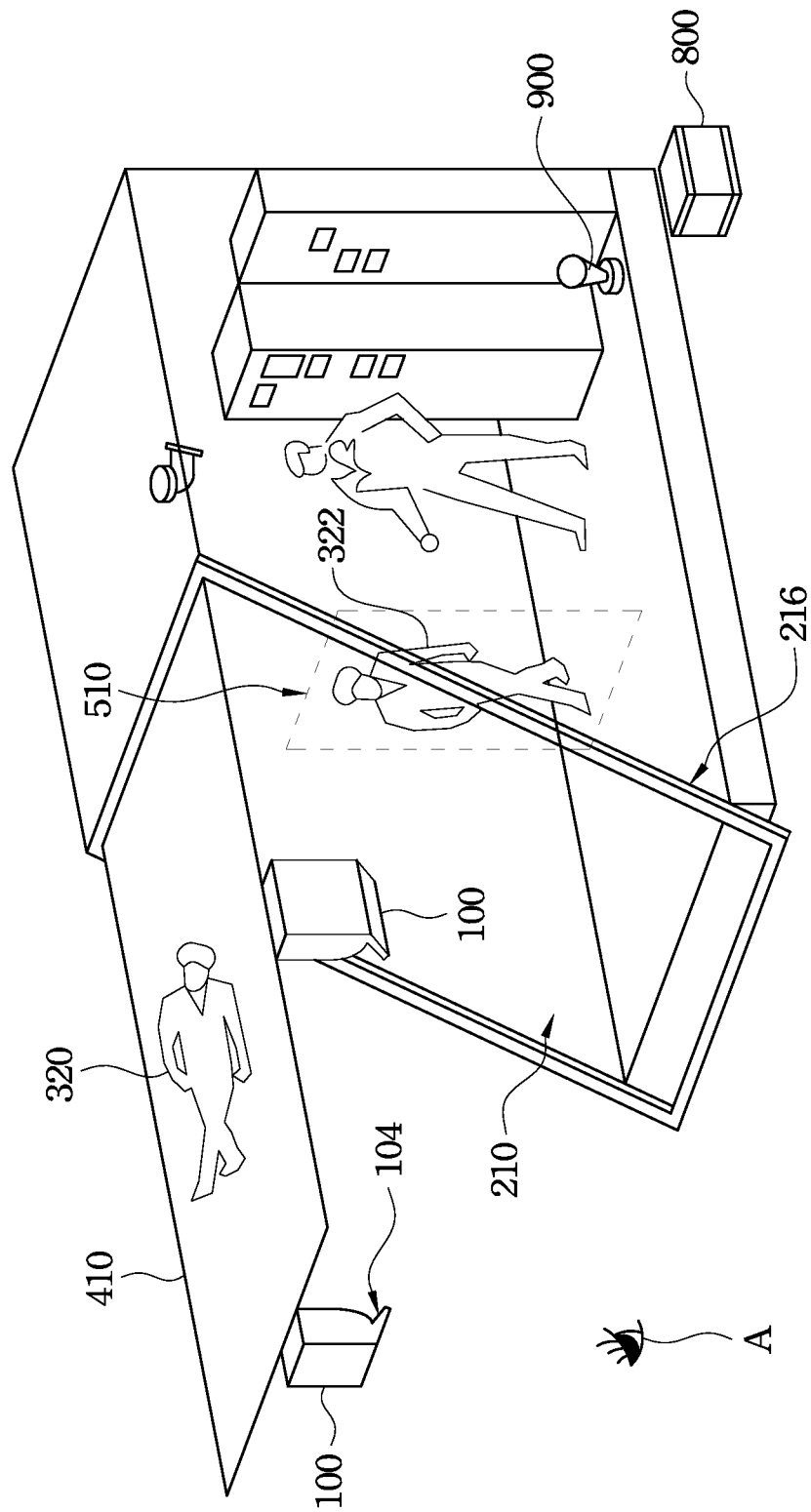
FIG. 8 is a perspective view of a projection system in accordance with the third embodiment of the present invention.
Figure 9:
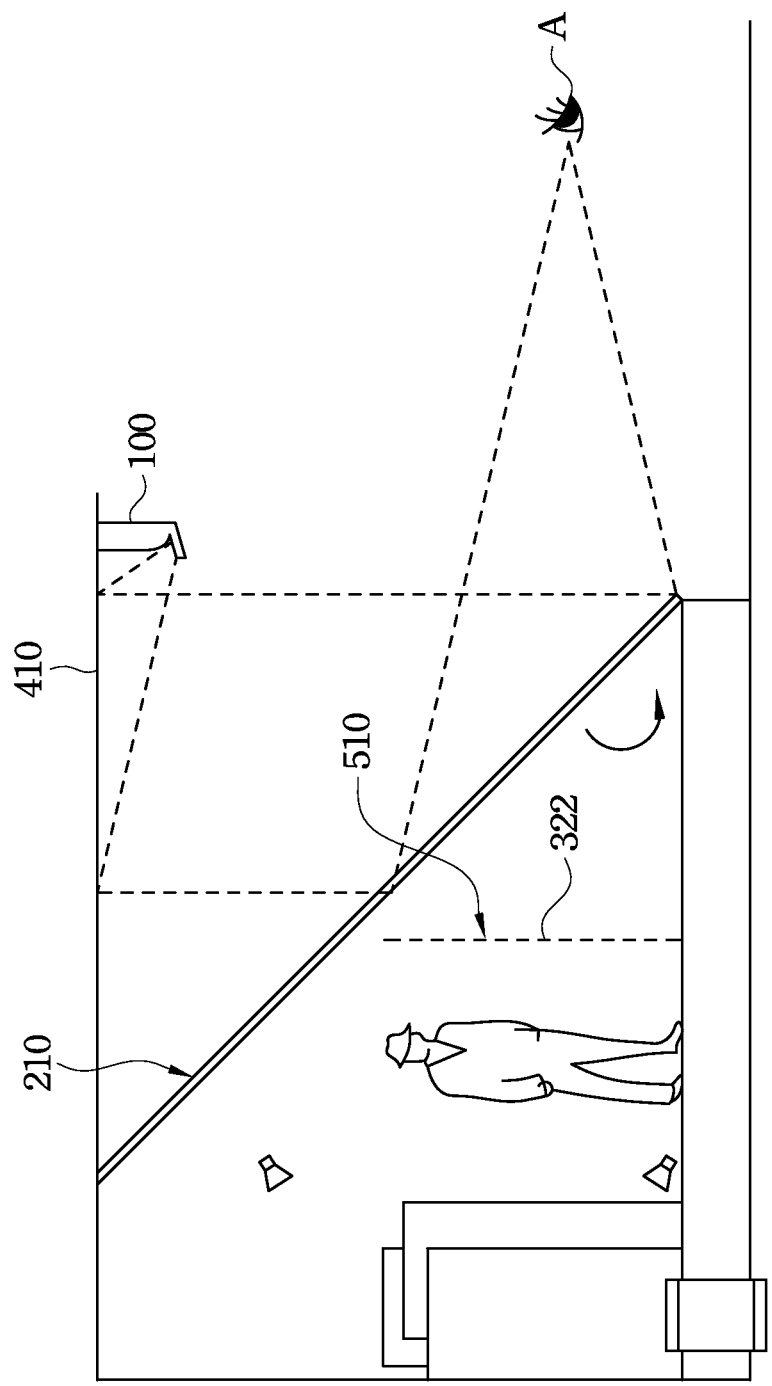
FIG. 9 is a side view of the projection system in FIG. 8.

FIG. 8 is a perspective view of a projection system in accordance with the third embodiment of the present invention. FIG. 9 is a side view of the projection system in FIG. 8. As shown in FIGS. 8 and 9, the main difference between the embodiment and the first embodiment is that the projection surface 410 is the ceiling, not the floor. In other words, the projector 100 is positioned on the ceiling, and utilizes the reflective mirror 104 thereof to project the first image 320 to the ceiling. Similar to the first embodiment, the holographic projection film 210 can mirror the first image 320 on the projection surface 410 to form the second image 322 on the imaging surface 510.

In some embodiments, the holographic projection film 210 is encompassed by the holographic projection frame 216. The angle between the holographic projection film 210 and the projection surface 410 is an acute angle.

Other technical features, such as the deformer 800, are described in the first embodiment, and therefore are not described herein.

Embodiment 4

Figure 10:
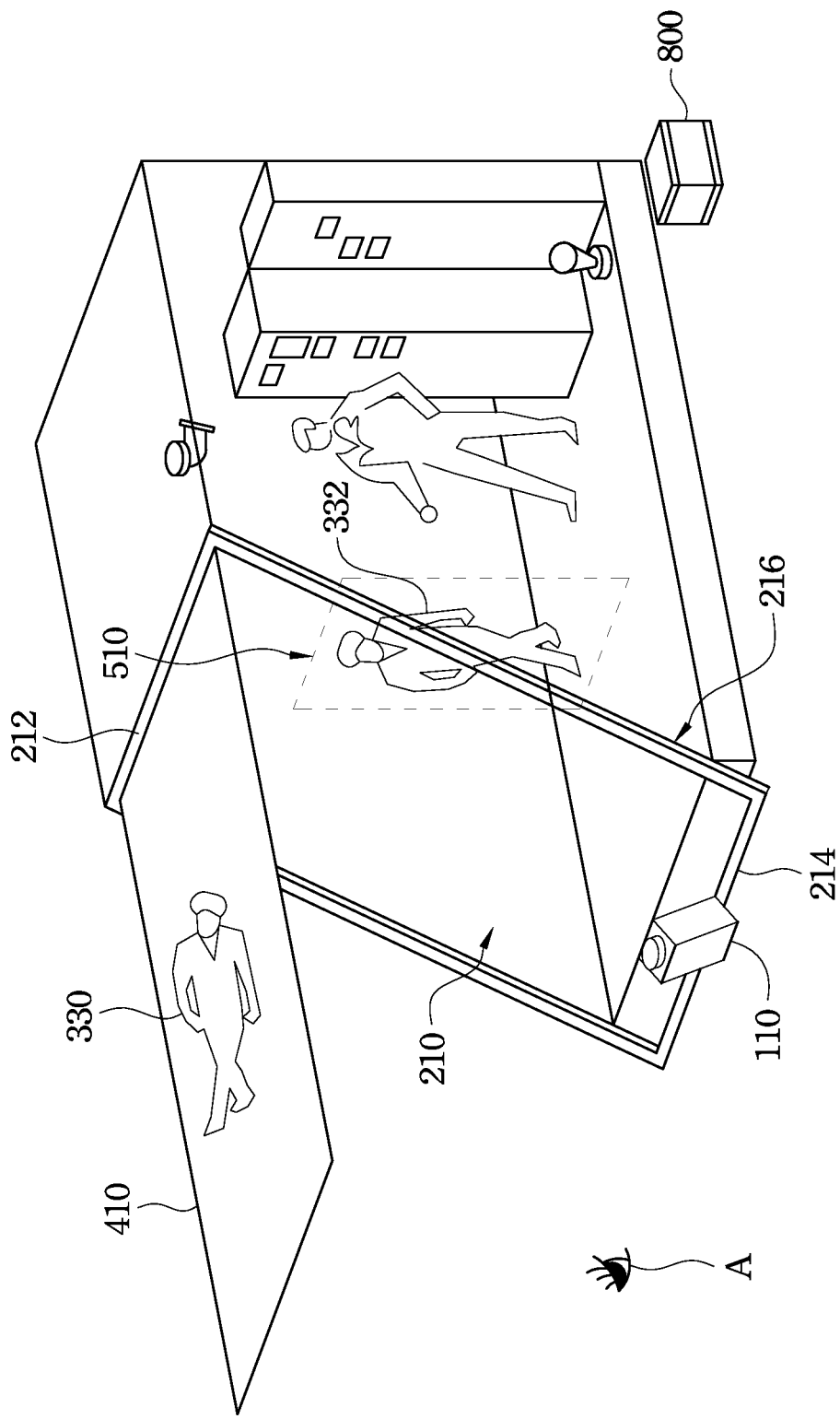
FIG. 10 is a perspective view of a projection system in accordance with the fourth embodiment of the present invention.
Figure 11:
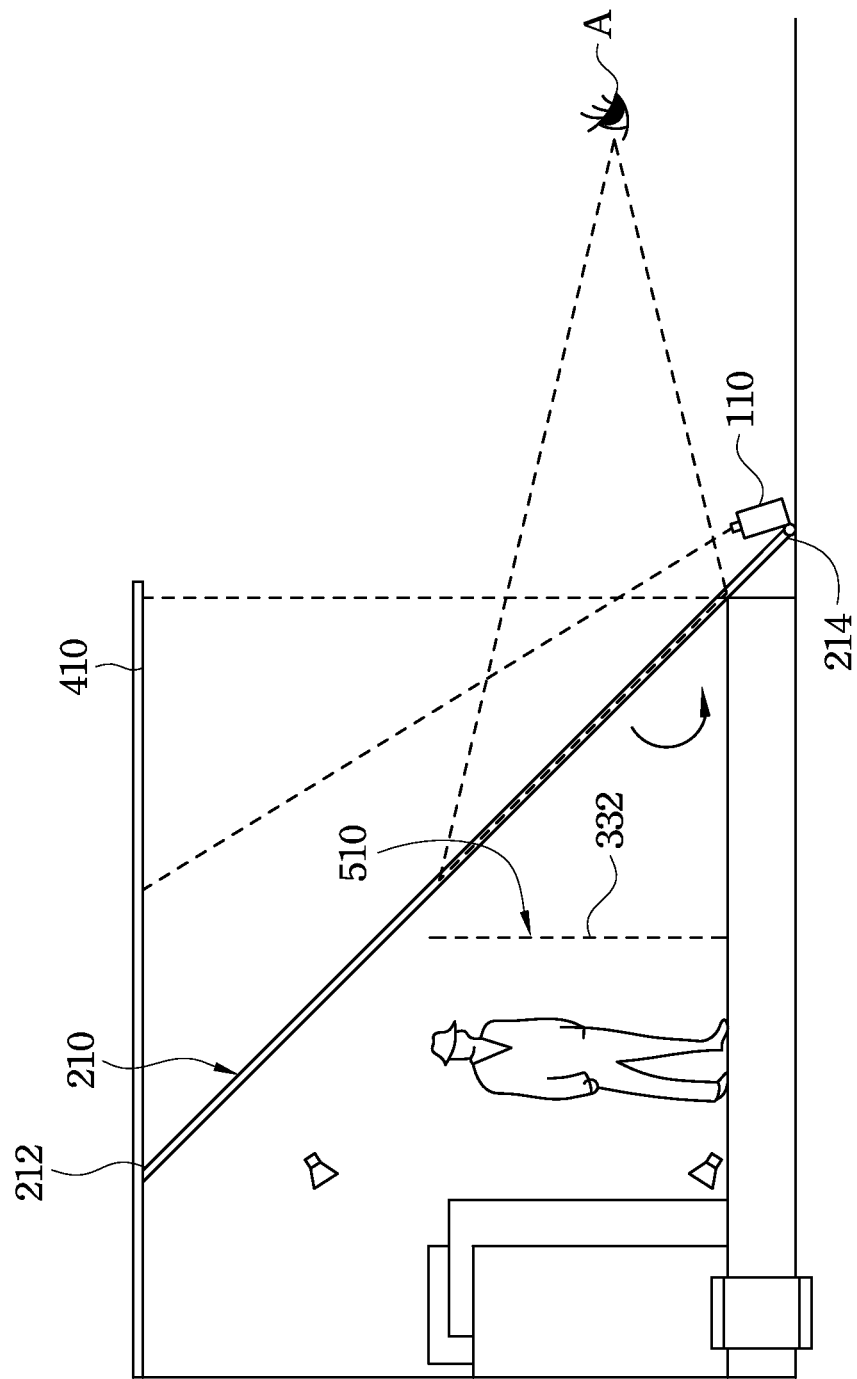
FIG. 11 is a side view of the projection system in FIG. 10.

FIG. 10 is a perspective view of a projection system in accordance with the fourth embodiment of the present invention. FIG. 11 is a side view of the projection system in FIG. 10. As shown in FIGS. 10 and 11, the main difference between the embodiment and the second embodiment is that the projection surface 410 is the ceiling, not the floor. Because the projector 110 is not an ultra-short throw projector, it is positioned on the floor and projects the first image 330 to the ceiling. The holographic projection film 210 can mirror the first image 330 on the projection surface 410 to form the second image 332 on the imaging surface 510.

As shown in FIG. 10, the proximal frame body 212 is connected to the projection surface 410 (the ceiling), and the distal frame body 214 is distal to the projection surface 410 (the ceiling). The projector 110 is positioned on the distal frame body 214, and is spatially separated from the projection surface 410, such that the projector 110 can project the first image 330 to the projection surface 410.

In some embodiments, the holographic projection film 210 is encompassed by the holographic projection frame 216. The angle between the holographic projection film 210 and the projection surface 410 is an acute angle, so that the first image 320 can be mirrored and to thereby form the second image 322 on the imaging surface 510.

In some embodiments, because the projector 110 obliquely projects the first image 330 to the projection surface 410, the first image 330 may deform, and the image deformation control unit 830 (See FIG. 5) of the deformer 800 can be utilized to suppress the deformation of the first image 330. For example, the image deformation control unit 830 can modify a trapezoidal frame to a rectangular frame.

Other technical features are described in the foregoing embodiments, and therefore are not described herein.

Embodiment 5

Figure 12:
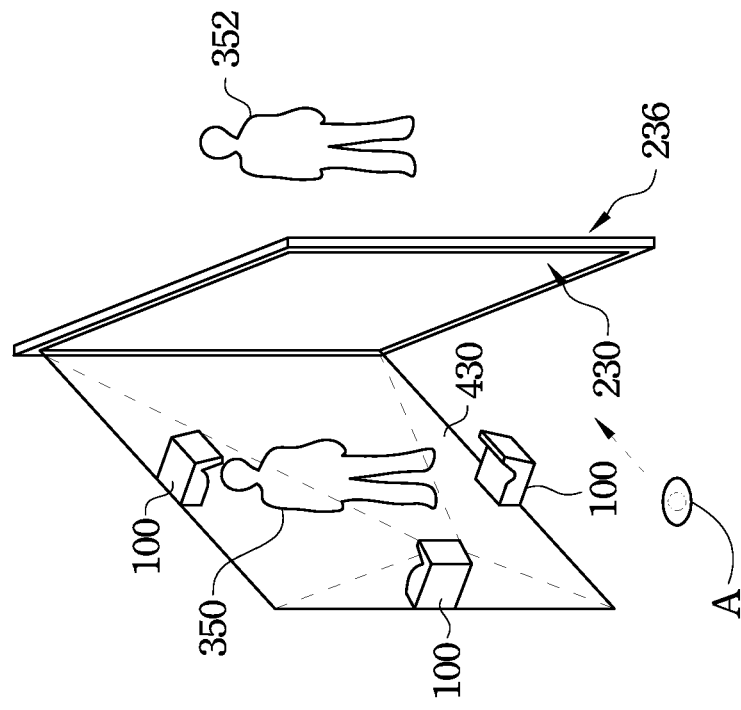
FIG. 12 is a perspective view of a projection system in accordance with the fifth embodiment of the present invention.

FIG. 12 is a perspective view of a projection system in accordance with the fifth embodiment of the present invention. As shown in FIG. 12, the main difference between the embodiment and the foregoing embodiments is that the projection surface 420 is a wall, and the holographic projection film 220 is positioned on the left side of the projection surface 420. The projector 100 is the ultra-short throw projector, and it is disposed on the projection surface 420. The projector 100 can utilize the reflective mirror 104 (See FIG. 4) to project the first image 340 to the projection surface 420. The holographic projection film 220 can mirror the first image 340 to form the second image 342 on another side of the holographic projection film 220 opposite to the projection surface 420.

In some embodiments, the holographic projection film 220 is encompassed by the holographic projection frame 226. The angle between the holographic projection film 220 and the projection surface 420 is an acute angle.

Other technical features are described in the foregoing embodiments, and therefore are not described herein.

Embodiment 6

Figure 13:
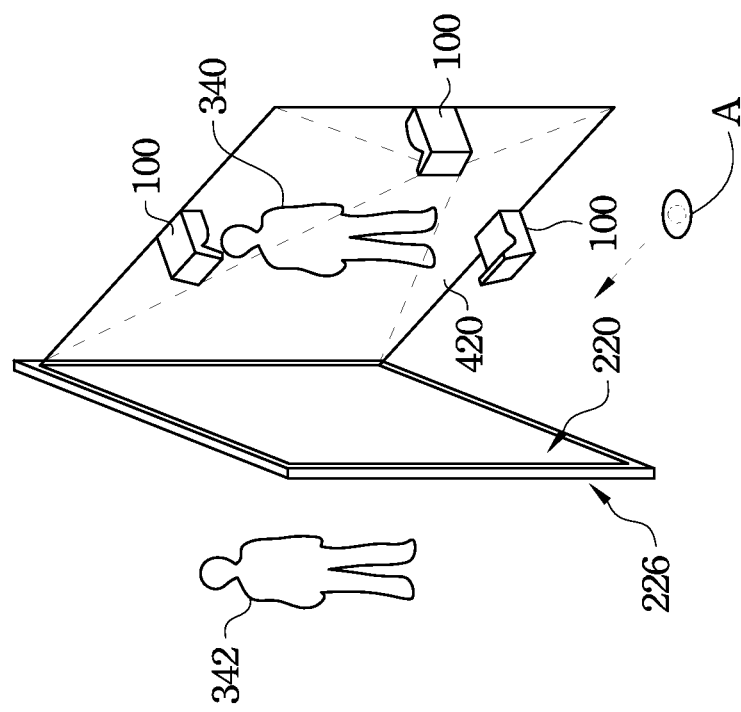
FIG. 13 is a perspective view of a projection system in accordance with the sixth embodiment of the present invention.

FIG. 13 is a perspective view of a projection system in accordance with the sixth embodiment of the present invention. As shown in FIG. 13, the main difference between the embodiment and the foregoing embodiments is that the projection surface 430 is a wall, and the holographic projection film 230 is positioned on the right side of the projection surface 430. The projector 100 is the ultra-short throw projector, and it is disposed on the projection surface 430. The projector 100 can utilize the reflective mirror 104 (See FIG. 4) to project the first image 350 to the projection surface 430. The holographic projection film 230 can mirror the first image 350 to form the second image 352 on another side of the holographic projection film 230 opposite to the projection surface 430.

In some embodiments, the holographic projection film 230 is encompassed by the holographic projection frame 236. The angle between the holographic projection film 230 and the projection surface 430 is an acute angle.

Other technical features are described in the foregoing embodiments, and therefore are not described herein.

Embodiment 7

Figure 14:
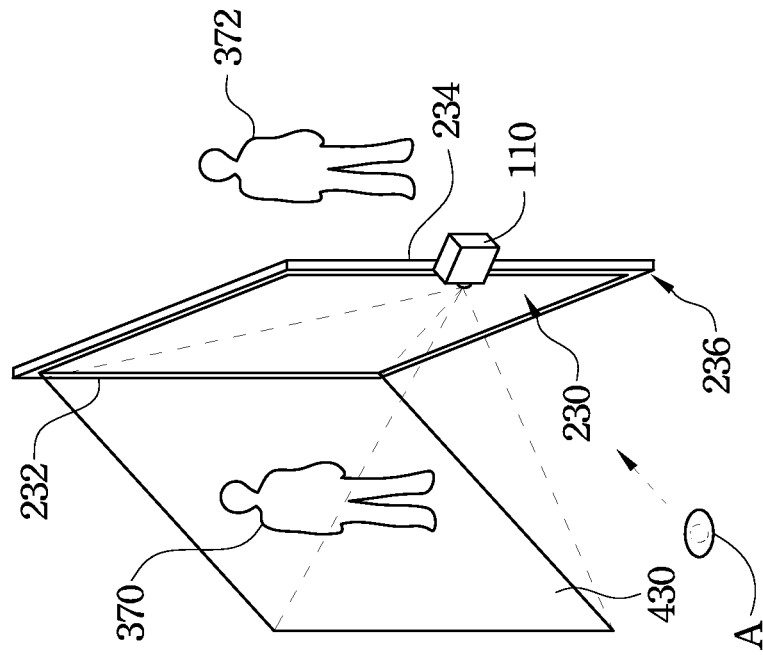
FIG. 14 is a perspective view of a projection system in accordance with the seventh embodiment of the present invention.

FIG. 14 is a perspective view of a projection system in accordance with the seventh embodiment of the present invention. As shown in FIG. 14, the main difference between the embodiment and the foregoing embodiments is that the projection surface 420 is a wall, and the holographic projection film 220 is positioned on the left side of the projection surface 420. The projector 110 is not the ultra-short throw projector. The holographic projection frame 226 includes the proximal frame body 222 and the distal frame body 224 opposite to the proximal frame body 222. The proximal frame body 222 is connected to the projection surface 420, and the distal frame body 224 is distal to the projection surface 420. The projector 110 is positioned on the distal frame body 224, and projects the first image 360 to the projection surface 420. The holographic projection film 220 mirrors the first image 360 to form the second image 362 on another side of the holographic projection film 220 opposite to the projection surface 420.

Other technical features are described in the foregoing embodiments, and therefore are not described herein.

Embodiment 8

Figure 15:
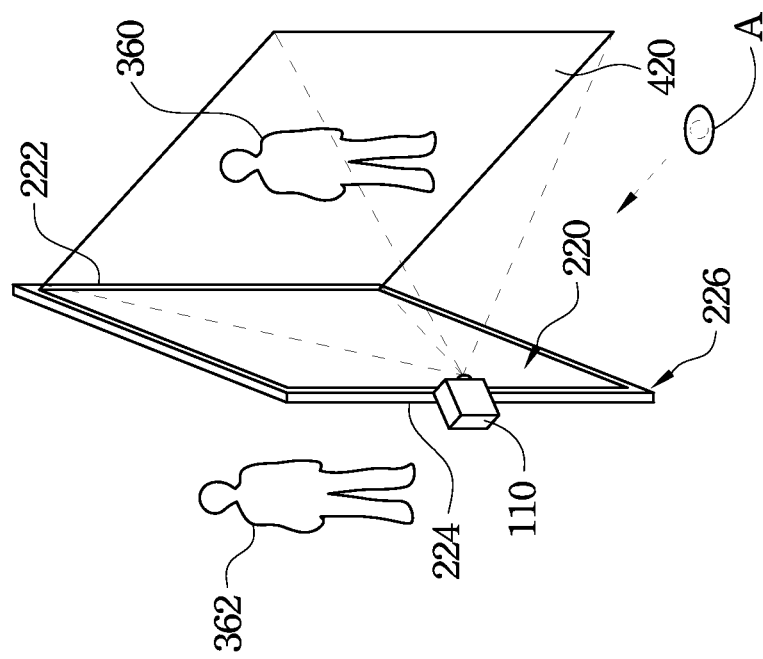
FIG. 15 is a perspective view of a projection system in accordance with the eighth embodiment of the present invention.

FIG. 15 is a perspective view of a projection system in accordance with the eighth embodiment of the present invention. As shown in FIG. 15, the main difference between the embodiment and the foregoing embodiments is that the projection surface 430 is a wall, and the holographic projection film 230 is positioned on the right side of the projection surface 430. The projector 110 is not the ultra-short throw projector. The holographic projection frame 236 includes the proximal frame body 232 and the distal frame body 234 opposite to the proximal frame body 232. The proximal frame body 232 is connected to the projection surface 430, and the distal frame body 234 is distal to the projection surface 430. The projector 110 is positioned on the distal frame body 234, and projects the first image 370 to the projection surface 430. The holographic projection film 230 mirrors the first image 370 to form the second image 372 on another side of the holographic projection film 230 opposite to the projection surface 430.

Other technical features are described in the foregoing embodiments, and therefore are not described herein.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection system, comprising:
   at least one projector for projecting a first image to a projection surface;
   a holographic projection film for mirroring the first image on the projection surface to form a second image on an imaging surface, wherein the projection surface and a standard surface define a first angle therebetween, the first angle being Y degrees, and the holographic projection film and the standard surface define a second angle therebetween, the second angle being 45+X degrees, wherein Y and X substantially satisfy: Y=2X;
   a holographic projection frame encompassing the holographic projection film; and an angle adjusting device comprising a motor, the angle adjusting device being coupled to the holographic projection frame and configured to mechanically drive the holographic projection frame to rotate so as to adjust the second angle.

2. The projection system of claim 1, wherein the projector is disposed on the projection surface.

3. The projection system of claim 1, wherein the projector comprises:
- a projector body disposed on the projection surface;
- a lens module disposed in the projector body for generating and enlarging an initial image;
- a reflective mirror carrier connected to the projector body; and
- a reflective mirror disposed on the reflective mirror carrier for adjusting the aberration and the distortion of the initial image and reflecting the adjusted initial image to the projection surface, so as to form the first image.

4. The projection system of claim 3, wherein the TR (Throw Ratio) of the projector substantially satisfies: $0<TR<0.38$.

5. The projection system of claim 3, wherein the reflective mirror and the projection surface define a maximum distance d therebetween, wherein the maximum distance d substantially satisfies: $2.24 \text{ cm} \leq d \leq 6.23 \text{ cm}$.

6. The projection system of claim 1, wherein the holographic projection frame comprises a proximal frame body and a distal frame body opposite to the proximal frame body, wherein the proximal frame body is connected to the projection surface, and the distal frame body is distal to the projection surface, wherein the projector is positioned on the distal frame body.

7. The projection system of claim 6, further comprising a rotation driver for driving the projector to rotate relative to the holographic projection film.

8. The projection system of claim 1, wherein the second angle substantially satisfies: $30 \leq 45+X \leq 60$ degrees.

9. The projection system of claim 1, wherein the projector is positioned on a ceiling, a floor or a wall.

10. The projection system of claim 1, wherein the standard surface is substantially perpendicular to a gravity direction.

11. The projection system of claim 1, further comprising a deformer electrically connected to the projector, wherein the deformer comprises an image deformation control unit for suppressing the deformation of the first image on the projection surface.

12. The projection system of claim 1, further comprising a deformer electrically connected to the projector, wherein the deformer comprises an image adjoin unit for adjoining the first images projected by the projectors.

13. The projection system of claim 1, further comprising a deformer electrically connected to the projector, wherein the deformer comprises an image overlap unit for overlapping the first images projected by the projectors.

14. The projection system of claim 1, wherein the transmittance T of the holographic projection film substantially satisfies: $70\% \leq T \leq 90\%$.

15. The projection system of claim 1, further comprising at least one illumination device disposed on one side of the imaging surface opposite to the holographic projection film.

* * * * *